United States Patent [19]

Scarr

[11] 4,167,609

[45] Sep. 11, 1979

[54] ZINC OXIDE ADDITIVE FOR DIVALENT SILVER OXIDE ELECTRODES

[75] Inventor: Robert F. Scarr, Fairview Park, Ohio

[73] Assignee: Union Carbide Corporation, New York, N.Y.

[21] Appl. No.: 891,823

[22] Filed: Mar. 30, 1978

[51] Int. Cl.$^2$ ............................................. H01M 6/06
[52] U.S. Cl. ................................... 429/206; 429/218; 429/219; 429/222; 429/229
[58] Field of Search ............... 429/219, 231, 229, 206, 429/57, 59, 60, 218, 222

[56] References Cited

U.S. PATENT DOCUMENTS

| 3,104,990 | 9/1963 | Solomon et al. | 429/219 |
| 3,615,830 | 10/1971 | Johnson | 429/206 |
| 3,907,598 | 9/1975 | Megahed | 429/206 |

*Primary Examiner*—Anthony Skapars
*Attorney, Agent, or Firm*—Cornelius F. O'Brien

[57] ABSTRACT

An alkaline silver oxide cell employing a positive electrode comprising a major amount of divalent silver oxide and wherein a minor amount of zinc oxide is incorporated into the positive electrode to reduce the duration of the divalent silver oxide step voltage normally observed during discharge of the cell.

13 Claims, No Drawings

ZINC OXIDE ADDITIVE FOR DIVALENT SILVER OXIDE ELECTRODES

FIELD OF THE INVENTION

The invention relates to alkaline silver oxide cells and especially to such cells wherein the positive electrode comprises divalent silver oxide and a minor amount of zinc oxide between about 0.5 and 10 weight percent of the dry weight of the divalent silver oxide in the positive electrode. The addition of the zinc oxide will improve the chemical stability of the positive electrode and reduce the duration of the divalent silver oxide step voltage during discharge of the cell.

BACKGROUND OF THE INVENTION

Miniature alkaline silver oxide button cells have gained wide commercial acceptance in the battery industry for many applications because they are characterized as being high capacity, small volume electric cells. In other words, they have a high power output and energy per unit weight and unit volume of active cathode material. However, one of the major disadvantages of divalent silver oxide cells is that they discharge at two successive different potentials. This is due to the fact that the active materials of such cells are first divalent silver oxide (AgO) and then monovalent silver oxide ($Ag_2O$). Silver oxide cells using monovalent silver oxide as the only active cathode material will have a theoretical unipotential discharge at about 1.57 volts but the capacity in milliampere hours per gram of monovalent silver oxide is substantially lower than the capacity with divalent silver oxide. On the other hand, silver oxide button cells using only divalent silver oxide as the starting active cathode material will discharge at a first potential at about 1.7 volts across a 300-ohm resistor for the first 40 hours of discharge, for example, and then drop to approximately 1.5 volts for the remaining useful discharge life. Thus monovalent silver oxide cells have the advantage of discharging at a single unipotential plateau but with some sacrifice in capacity as compared with divalent silver oxide cells which have the advantage of having a much higher capacity but with the disadvantage of discharging at two successive distinct voltage plateaus. Divalent silver oxide has about 1.9 times more capacity per gram than monovalent silver oxide and about 2 times more capacity per unit volume than monovalent silver oxide.

Many cell or battery applications, particularly in transistorized devices such as hearing aids, watches and the like, require an essentially unipotential discharge source for proper operation and, therfore, cannot effectively use the dual voltage level discharge which is normally characteristic of divalent silver oxide cells.

Consequently, many methods have been proposed for obtaining a unipotential discharge from a divalent silver oxide cell without undue sacrifice in capacity. One method disclosed in U.S. Pat. Nos. 3,615,858 and 3,655,450 entails providing a continuous layer of monovalent silver oxide in physical and electrical contact with a divalent silver oxide pellet. During assembly of the cell, the cathode pellet is disposed against the inner surface of a cathode cup or collector whereupon the layer of monovalent silver oxide physically isolates the divalent silver oxide from contact with the cathode cup so that the sole electronic path for discharge of the divalent silver oxide is through the monovalent silver oxide layer.

In U.S. Pat. No. 3,476,610 a silver oxide battery is disclosed which employs a positive electrode comprised mainly of divalent silver oxide with the addition of monovalent silver oxide present in part as an electrolyte-impermeable masking layer. This layer isolates the divalent silver oxide from contact with the electrolyte of the battery until discharge begins whereupon the monovalent silver oxide becomes electrolyte-permeable. When this occurs, the electrolyte then begins to contact the divalent silver oxide. In addition, the monovalent silver oxide is also present as an interposed layer between the divalent silver oxide and the inner surface of the cathode cup or collector so as to isolate the divalent silver oxide from electronic contact with said cathode cup which is the positive terminal of the cell.

In U.S. Pat. No. 3,484,295 a silver oxide battery is disclosed which utilizes a positive silver oxide electrode comprising divalent silver oxide and monovalent silver oxide. The latter oxide is employed as an electrolyte-impermeable layer which is interposed between the divalent silver oxide and the battery components containing the electrolyte so as to isolate the divalent silver oxide from contact with the electrolyte until the monovalent silver material is discharged. If the discharge product of the monovalent silver material is continually reoxidized by the divalent silver material in the presence of the battery electrolyte, then it is possible that the battery will yield a unipotential discharge.

In U.S. Pat. No. 3,920,478 a silver oxide cell is disclosed which employs a positive electrode comprising divalent silver oxide housed in a positive electrode container and interposed between the positive electrode and the inner wall of the cathode container and/or between the positive electrode and the separator is a discontinuous oxidizable metal, such as a zinc screen, which functions to isolate a portion of the positive electrode from the container so as to produce a unipotential discharge on low drain conditions.

In U.S. Pat. No. 3,925,102 a silver oxide cell is disclosed which employs a positive electrode comprising divalent silver oxide housed in a positive electrode container having an upstanding wall and a closed end. Interposed between the positive electrode and the inner upstanding wall is an oxidizable zinc ring which functions to isolate a portion of positive electrode from the container so as to produce a unipotential discharge on low drain conditions.

In addition to the disadvantage of a divalent silver oxide electrode in an alkaline silver oxide cell discharging at two successive different potentials, it is relatively unstable when in contact with aqueous alkaline solutions. Specifically, divalent silver oxide evolves oxygen when in contact with aqueous alkaline solutions which results in a loss of capacity due to the conversion of divalent silver oxide to monovalent silver oxide. In addition, the gassing of the divalent silver oxide creates a problem in providing proper sealing of the cells. U.S. Pat. No. 3,853,623 discloses the use of a gold additive admixed into a divalent silver oxide electrode or incorporated into an aqueous alkaline electrolyte of a cell, to improve the stability of the divalent silver oxide electrode in the aqueous alkaline electrolyte.

Accordingly, it is an object of the present invention to provide a silver oxide electrode for electrochemical cells which comprises a major portion of divalent silver oxide and a minor amount of zinc oxide.

Another object of this invention is to incorporate a minor amount of zinc oxide into a divalent silver oxide-containing material so as to produce an improved positive electrode for miniature alkaline silver oxide button cells.

Another object of this invention is to provide a silver oxide cell which employs a positive electrode comprising divalent silver oxide and has a substantially unipotential discharge plateau over the useful life of the cell.

Another object of this invention is to provide a silver oxide electrode for a silver oxide/zinc cell wherein said electrode comprises a major portion of divalent silver oxide and a minor amount of zinc oxide, said zinc oxide being added primarily to diminish the duration of the divalent step during discharge of the cell and to improve the chemical stability of the divalent silver oxide in contact with an aqueous alkaline electrolyte.

Another object of this invention is to incorporate a minor amount of zinc oxide into a divalent silver oxide-containing material so as to improve lubricity of the mixture so that during a pelletizing operation of the mixture, the pellets so formed can be more easily released from the mold.

SUMMARY OF THE INVENTION

The invention relates to an alkaline cell having a negative electrode, an alkaline electrolyte and a positive electrode comprising a major portion of divalent silver oxide, the improvement comprising incorporating a minor amount of zinc oxide in the divalent silver oxide-containing positive electrode to reduce the duration of the divalent step during discharge of the cell.

As used herein, a silver oxide electrode shall mean an electrode wherein the active cathode material is divalent silver oxide or an electrode wherein the major active material is divalent silver oxide in conjunction with a minor amount of monovalent silver oxide and/or some other reducible material, such as cadmium oxide.

According to the present invention, the addition of zinc oxide to a silver oxide electrode of a silver oxide cell will reduce or diminish the duration of the divalent silver oxide voltage step during discharge of the cell and improve the chemical stability of the divalent silver oxide in the presence of the cell's alkaline electrolyte. In addition, in a silver oxide/zinc cell system, the zinc oxide additive does not constitute a material deleterious to the cell system.

It is believed that zinc oxide operates in the solid phase rather than in solution and therefore the amount of zinc oxide which can be added to effectively reduce the divalent voltage step is not limited to the amount that would be soluble in the electrolyte. The amount of reduction of the divalent voltage step is substantially in proportion to the amount of the zinc oxide additive up to about 10 percent by weight of the divalent silver oxide. However, in an amount less than 2% of zinc oxide, it has been observed that zinc oxide has an unfavorable effect on the divalent voltage step duration. Thus in accordance with this invention, the zinc oxide is introduced into the cell as a solid mixed into the silver oxide electrode. Use of this additive has an additional advantage in that the presence of the zinc oxide in the silver oxide electrode mix has been observed to facilitate the release of an electrode pellet from a mold during a pelletizing operation.

The amount of zinc oxide to be added to a silver oxide electrode of this invention should be between about 0.5 and 10 percent based on the dry weight of the divalent silver oxide in the electrode and preferably between about 2.5 and 3.5 percent based on the dry weight of the divalent silver oxide in the electrode. An amount of zinc oxide less than 2 percent would not effectively reduce the divalent silver oxide voltage step. In addition, it has been observed in some cases that when using less than 2 percent zinc oxide, the divalent silver oxide voltage step may actually be extended. However when using a zinc screen as disclosed in U.S. Pat. No. 3,920,478 between the silver oxide electrode and the cell's conductive container, the amount of zinc oxide added to the electrode could be decreased to 0.5 percent so as to provide chemical stability of the divalent silver oxide when in contact with aqueous alkaline electrolyte. When employing the zinc screen, the upper range of the added zinc oxide should be about 5 weight percent.

An amount of zinc oxide more than 10 percent of the dry divalent silver oxide in the electrode would be ineffective since too much of the high capacity silver oxide material would be physically replaced by the zinc oxide without effectively further reducing the duration of the divalent voltage step.

It has been observed that the addition of zinc oxide has no effect on the impedance of fresh silver oxide/zinc cells but does affect the change of impedance with time for low density electrodes. Where the silver oxide electrodes are high density electrodes, i.e., greater than 90 grams per cubic inch, the zinc oxide has no effect on the change of impedance with time, probably because of their resistance to electrolyte penetration. For low density silver oxide electrodes, i.e., below about 90 grams per cubic inch, the zinc oxide has a favorable effect on the change of impedance with time probably because it inhibits the reoxidation of conductive pathways which normally occurs during cell aging.

It is also within the scope of this invention additionally to add minor amounts of a stabilizer, a flow agent and/or a lubricating agent to the silver oxide mix to further alter the physical characteristics of the mix for molding purposes to produce various size and type electrodes. Examples of some of these additives are ethylene bis-stearamide, zinc stearate, lead stearate, calcium stearate and the like.

The silver oxide electrode of this invention could be employed in an aqueous cell system using an anode such as zinc, cadmium, indium or the like. The electrode couple so selected can be employed with a compatible electrolyte and preferably an alkaline electrolyte. Examples of suitable electrolytes include aqueous solutions of alkaline earth metal hydroxides such as strontium hydroxide and alkali metal hydroxides, exemplified by sodium hydroxide, potassium hydroxide, lithium hydroxide, rubidium hydroxide and cesium hydroxide. Compatible mixtures of the preceding may be utilized. Preferably the electrode of this invention should be porous so that the walls of the pores and interstices of the electrode can become wetted by the electrolyte.

The silver oxide electrode of this invention can also be employed on non-aqueous cell systems employing an anode such as lithium, sodium, potassium, calcium, magnesium or their alloys. Again, the electrode couple so selected should be employed with a compatible non-aqueous electrolyte.

EXAMPLE I

Several miniature button cells were produced using a zinc anode, an electrolyte of NaOH or KOH, a divalent silver oxide or divalent silver oxide and monovalent silver oxide cathode, and a dual separator consisting of cellulosic barrier film and an electrolyte absorbent layer disposed between anode and cathode. The components were assembled in a miniature button cell housing which was sealed in a conventional manner. Some of the cells were assembled with a zinc screen disposed between the cathode and the inner wall of the cell housing as disclosed in U.S. Pat. No. 3,920,478. One lot of the cells employed low density (74 g/in$^3$) cathode pellets and the other cell lot employed high density (90 g/in$^3$) cathode pellets.

The cells were discharged across at 96,000-ohm load and the time it took each cell to reach a 1.6 voltage level was observed. Each cell was then further discharged across a 6,500-ohm load until the time to reach a 1.3 volt level was determined from which the discharge efficiency of each cell was calculated.

The average open circuit voltage and impedance data of fresh cells are shown in Table I. Table II shows the average open circuit voltage and the divalent step service for cells aged between 1 and 2 months. Table III shows the average capacity and discharge efficiency for cells aged between 1 to 2 months. Table IV shows the average bulge and impedance data for cells aged 4 months. Table V shows the average open circuit voltage for cells aged up to 4 months.

The data in Table I show that the NaOH cells had larger impedances than the KOH cells and the addition of zinc oxide has no effect on the open circuit voltage of the cells.

The data in Table II show that with the addition of a suitable amount of zinc oxide to the divalent silver oxide-containing electrodes, the duration of the divalent silver oxide voltage step observed for the cells was greatly reduced, thus producing cells that can discharge at a substantially unipotential level over the useful life of the cells. As expected, the divalent silver oxide cells employing the zinc screen discharged at the monovalent voltage level immediately. The percent improvement in the reduction of the divalent voltage step through the use of the zinc oxide additive is greater when using low density cathode pellets as compared to high density cathode pellets.

The data in Table III show that the capacity and discharge efficiency are not affected by the addition of the zinc oxide. In addition, it was observed that one of the effects of zinc oxide was to improve the reproducibility of obtaining the monovalent silver oxide voltage level sooner at no expense of the cell's capacity and discharge efficiency.

The data in Table IV show bulge and impedance measurements for cells stored at room temperature for 4 months. With few exceptions, the cells bulged relatively little with the exception of the cell employing 100% divalent silver oxide electrodes produced using a high density pellet which bulged 0.0033 inch (0.0083 cm.). In general, the use of higher density cathode pellets has greater influence on the tendency to bulge than did the type of electrolyte used or the amount of zinc oxide added to positive electrode.

The data in Table V show the open circuit voltages for fresh cells and cells aged up to four months. The results show that the zinc oxide additive has virtually no effect on the open circuit voltages with time for the cells. For example, in cells where the original open circuit voltages are high, they remained high after four months both for the cells containing no zinc oxide and those cells containing zinc oxide.

In summary, the data presented in Tables I to V show that with the addition of zinc oxide to the cathode in a divalent silver oxide cell:

(1) the duration of the divalent voltage step can be decreased,
(2) there is a favorable effect on bulging where bulging is a problem,
(3) there is no adverse effect on the open circuit voltage and discharge efficiency, and
(4) there is a favorable effect on the change in impedance with time.

Table I

| Positive electrode AgO/Ag$_2$O (%) | Zn Screen | | Pellet Density | | | | | | | | | |
|---|---|---|---|---|---|---|---|---|---|---|---|---|
| | | | Low Density — Wt. % ZnO in Cathode | | | | | | High Density — Wt. % ZnO in Cathode | | | |
| | | | 0.0 | 0.5 | 1.5 | 2.1 | 3.0 | 4.5 | 0.0 | 0.5 | 1.5 | 4.5 |
| *50/50 | No | n | 10 | 10 | 10 | | | | 10 | 10 | 10 | 9, 10 |
| | | v | 1.86 | 1.86 | 1.86 | | | | 1.86 | 1.86 | 1.87 | 1.86, 1.86 |
| | | z | 97 | 95 | 94 | | | | 87 | 137 | 110 | 144, 155 |
| *70/30 | No | n | 10 | | 10 | 10 | | | 10 | | 10 | |
| | | v | 1.86 | | 1.86 | 1.86 | | | 1.86 | | 1.86 | |
| | | z | 61 | | 61 | 67 | | | 57 | | 67 | |
| | Yes | n | 9 | | 10 | 10 | | | | | | |
| | | v | 1.61 | | 1.61 | 1.61 | | | | | | |
| | | z | 52 | | 55 | 59 | | | | | | |
| *100/0 | No | n | 9 | 9 | | | 9 | 10 | | | 10 | |
| | | v | 1.86 | | | | 1.86 | 1.86 | | | 1.86 | |
| | | z | 45 | 44 | | | 51 | 43 | | | 46 | |
| | Yes | n | 9 | 10 | | | 9 | | | | | |
| | | v | 1.60 | 1.61 | | | 1.61 | | | | | |
| | | z | 58 | 53 | | | 55 | | | | | |
| **50/50 | No | n | 10 | 9 | 10 | | | | | | | |
| | | v | 1.74 | 1.82 | 1.78 | | | | | | | |
| | | z | 47 | 46 | 47 | | | | | | | |
| **70/30 | No | n | | | 10 | | | | | | | |
| | | v | | | 1.85 | | | | | | | |
| | | z | | | 40 | | | | | | | |
| | Yes | n | | | 10 | | | | | | | |
| | | v | | | 1.60 | | | | | | | |
| | | z | | | 36 | | | | | | | |
| **100/0 | No | n | | | 10 | | | | | | | |
| | | v | | | 1.85 | | | | | | | |
| | | z | | | 31 | | | | | | | |

Table I-continued

| Positive electrode AgO/Ag₂O (%) | Zn Screen | Pellet Density Low Density Wt. % ZnO in Cathode | | | | | | Pellet Density High Density Wt. % ZnO in Cathode | | | |
|---|---|---|---|---|---|---|---|---|---|---|---|
| | | 0.0 | 0.5 | 1.5 | 2.1 | 3.0 | 4.5 | 0.0 | 0.5 | 1.5 | 4.5 |
| | Yes | | | n 10<br>v 1.60<br>z 28 | | | | | | | |

*electrolyte = 28% NaOH
**electrolyte = 33% KOH
n = number of cells;
V = average o.c.v. (v);
z = average impedance at 40 Hz (ohms)

TABLE II

| Positive electrode AgO/Ag₂O (%) | Zn Screen | Pellet Density Low Density Wt. % ZnO in Cathode | | | | | | Pellet Density High Density Wt. % ZnO in Cathode | | | |
|---|---|---|---|---|---|---|---|---|---|---|---|
| | | 0.0 | 0.5 | 1.5 | 2.1 | 3.0 | 4.5 | 0.0 | 0.5 | 1.5 | 4.5 |
| *50/50 | No | V 1.86 T 5.1 | V 1.85 T 9.8 | V 1.83 T 2.3 | | | V 1.85 T 2.1 | V 1.86 T₁ 99 T₂ 40 | V 1.86 T₁ 112 T₂ 48 | V 1.86 T₁ 128 T₂ 43 | V 1.85 T₁ 79 T₂ 38 |
| *70/30 | No | V 1.86 T 43 | | V 1.87 T 5.6 | V 1.85 T 18.2 | | V 1.85 T 5.4 | | | V 1.85 T₁ 239 T₂ 143 | |
| | Yes | V 1.61 T .00 | | V 1.61 T .00 | V 1.62 T .00 | | | | | | |
| *100/0 | No | V 1.85 T 337 | | V 1.85 T 618 | | V 1.85 T 362 | V 1.85 T 270 | | | V 1.85 T₁ 466 T₂ 392 | |
| | Yes | V 1.69 T .00 | | V 1.69 T .00 | V 1.68 T .00 | | | | | | |
| **50/50 | No | V 1.68 T .04 | V 1.76 T .07 | V 1.69 T .03 | | | V 1.59 T .00 | | | | |
| **70/30 | No | | | V 1.80 T .18 | | | | | | | |
| | Yes | | | V 1.59 T .00 | | | | | | | |
| **100/0 | No | | | V 1.85 T 118 | | | | | | | |
| | Yes | | | V 1.63 T .00 | | | | | | | | v = o.c.v. (v)
*electrolyte = 28% NaOH
**electrolyte = 33% KOH
T = Service to 1.6 v (hr) - 1-2 months
T₁ = Service to 1.6 v (hr) - 1 month
T₂ = Service to 1.6 v (hr) - 2 month

TABLE III

| Positive electrode AgO/Ag₂O (%) | Zn Screen | Pellet Density Low Density Wt. % ZnO in Cathode | | | | | | Pellet Density High Density Wt. % ZnO in Cathode | | | |
|---|---|---|---|---|---|---|---|---|---|---|---|
| | | 0.0 | 0.5 | 1.5 | 2.1 | 3.0 | 4.5 | 0.0 | 0.5 | 1.5 | 4.5 |
| *50/50 | No | n 4 Q 158 E 91.8 | n 4 Q 163 E 93.6 | n 5 Q 155 E 91.8 | | | n 4 Q 150 E 91.8 | n 5 Q 165 E 92.5 | n 3 Q 165 E 92.6 | n 5 Q 160 E 95.7 | n 5 Q 152 E 90.6 |
| *70/30 | No | n 5 Q 183 E 94.0 | | n 5 Q 180 E 92.5 | n 4 Q 183 E 93.4 | | n 4 Q 170 E 91.6 | | | n 5 Q 181 E 92.8 | |
| | Yes | n 5 Q 179 E 96.0 | | n 5 Q 168 E 93.9 | n 5 Q 174 E 95.6 | | | | | | |
| *100/0 | No | n 5 Q 207 E 92.0 | | n 3 Q 205 E 91.8 | | n 5 Q 196 E 90.7 | n 4 Q 194 E 89.5 | | | n 5 Q 208 E 93.2 | |
| | Yes | n 5 Q 198 E 93.4 | | n 5 Q 194 E 93.3 | | n 5 Q 194 E 95.4 | | | | | |
| **50/50 | No | n 5 Q 147 E 85.3 | n 5 Q 151 E 88.0 | n 5 Q 147 E 85.8 | | | n 5 Q 138 E 85.4 | | | | |
| **70/30 | No | | | n 5 Q 171 E 88.7 | | | | | | | |
| | | | | n 5 | | | | | | | |

TABLE III-continued

| Positive electrode AgO/Ag₂O (%) | Zn Screen | Pellet Density | | | | | | | | | |
|---|---|---|---|---|---|---|---|---|---|---|---|
| | | Low Density | | | | | | High Density | | | |
| | | Wt. % ZnO in Cathode | | | | | | Wt. % ZnO in Cathode | | | |
| | | 0.0 | 0.5 | 1.5 | 2.1 | 3.0 | 4.5 | 0.0 | 0.5 | 1.5 | 4.5 |
| | Yes | | | Q 163<br>E 92.0 | | | | | | | |
| **100/0 | No | | | n 5<br>Q 140<br>E 84.7 | | | | | | | |
| | Yes | | | n 5<br>Q 181<br>E 86.2 | | | | | | | |

*electrolyte = 28% NaOH
**electrolyte = 33% KOH
n = Number of cells;
Q = Average capacity (mAh)
E = Average discharge efficiency (%) obtained by continuous discharge on a 96 K-ohm load to a 1.6 volt level and then continued on a discharge across a 6.5 ohm load to a 1.3 volt level.

TABLE IV

| Positive electrode AgO/Ag₂O (%) | Zn Screen | Pellet Density | | | | | | | | | |
|---|---|---|---|---|---|---|---|---|---|---|---|
| | | Low Density | | | | | | High Density | | | |
| | | Wt. % ZnO in Cathode | | | | | | Wt. % ZnO in Cathode | | | |
| | | 0.0 | 0.5 | 1.5 | 2.1 | 3.0 | 4.5 | 0.0 | 0.5 | 1.5 | 4.5 |
| *50/50 | No | n 5<br>b .7<br>Z 103 | n 5<br>b 1.0<br>Z 132 | n 5<br>b 1.1<br>Z 104 | | | n 5<br>b −.3<br>Z 78 | n 5<br>b 1.3<br>Z 99 | n 5<br>b .9<br>Z 92 | n 4<br>b .9<br>Z 137 | n 5<br>b .3<br>Z 170 |
| *70/30 | No | n 5<br>b .2<br>Z 79 | | n 5<br>b .5<br>Z 86 | n 5<br>b −.3<br>Z 76 | | n 5<br>b .5<br>Z 68 | | | n 5<br>b 1.3<br>Z 73 | |
| | Yes | n 3<br>b .7<br>Z 51 | | n 5<br>b −.4<br>Z 54 | n 5<br>b −.5<br>Z 81 | | | | | | |
| *100/0 | No | n 4<br>b −.8<br>Z 53 | | n 5<br>b .7<br>Z 57 | | n 4<br>b .4<br>Z 64 | n 5<br>b 0<br>Z 59 | | | n 5<br>b 3.3<br>Z 51 | |
| | Yes | n 3<br>b −.2<br>Z 40 | | n 5<br>b .1<br>Z 40 | | n 4<br>b −.1<br>Z 46 | | | | | |
| **50/50 | No | n 5<br>b 1.3<br>Z 49 | n 4<br>b 1.3<br>Z 53 | n 5<br>b .5<br>Z 52 | | | n 5<br>b −.3<br>Z 39 | | | | |
| **70/30 | No | | | n 4<br>b .9<br>Z 41 | | | | | | | |
| | Yes | | | n 5<br>b −.2<br>Z 41 | | | | | | | |
| **100/0 | No | | | n 5<br>b −.8<br>Z 33 | | | | | | | |
| | Yes | | | n 4<br>b −.2<br>Z 29 | | | | | | | | n = number of cells
b = average bulge (mils)
Z = average impedance at 40 Hz
Negative bulge and the negative numbers in the table refer to a decrease in cell height which often occurs on storage.
*electrolyte = 28% NaOH
**electrolyte = 33% KOH

TABLE V

| Positive electrode AgO/Ag₂O (%) | Zn Screen | Pellet Density | | | | | | | | | |
|---|---|---|---|---|---|---|---|---|---|---|---|
| | | Low Density | | | | | | High Density | | | |
| | | Wt. % ZnO in Cathode | | | | | | Wt. % ZnO in Cathode | | | |
| | | $1_{0.0}^2$ | $1_{0.5}^2$ | $1_{1.5}^2$ | $1_{2.1}^2$ | $1_{3.0}^2$ | $1_{4.5}^2$ | $1_{0.0}^2$ | $1_{0.5}^2$ | $1_{1.5}^2$ | $1_{4.5}^2$ |
| *50/50 | No. | 0 1.86<br>1 1.86<br>4 1.85 | 0 1.86<br>1 1.85<br>4 1.85 | 0 1.86<br>1 1.83<br>4 1.78 | | | 0 1.86<br>1 1.85<br>4 1.82 | 0 1.86<br>1 1.86<br>4 1.82 | 0 1.87<br>1 1.86<br>4 1.84 | 0 1.86<br>1 1.86<br>4 1.83 | 0 1.86<br>1 1.85<br>4 1.83 |
| *70/30 | No | 0 1.86<br>1 1.86<br>4 1.85 | | 0 1.86<br>1 1.87<br>4 1.85 | 0 1.86<br>1 1.85<br>4 1.85 | | 0 1.86<br>1 1.85<br>4 1.82 | | | 0 1.86<br>1 1.85<br>4 1.85 | |
| | Yes | 0 1.61<br>1 1.61<br>4 1.70 | | 0 1.61<br>1 1.61<br>4 1.66 | 0 1.61<br>1 1.62<br>4 1.71 | | | | | | |
| | | 0 1.86 | 0 | | 0 1.86 | 0 1.86 | | | | 0 1.86 | |

TABLE V-continued

| Positive electrode AgO/Ag$_2$O (%) | Zn Screen | Pellet Density - Low Density - Wt. % ZnO in Cathode | | | | | | | | | | | | Pellet Density - High Density - Wt. % ZnO in Cathode | | | | | | |
|---|---|---|---|---|---|---|---|---|---|---|---|---|---|---|---|---|---|---|---|---|
| | | $^1$0.0$^2$ | | $^1$0.5$^2$ | | $^1$1.5$^2$ | | $^1$2.1$^2$ | | $^1$3.0$^2$ | | $^1$4.5$^2$ | | $^1$0.0$^2$ | | $^1$0.5$^2$ | | $^1$1.5$^2$ | | $^1$4.5$^2$ |
| *100/0 | No | 1 | 1.85 | | | 1 | 1.85 | | | 1 | 1.85 | 1 | 1.85 | | | | | 1 | 1.85 | | |
| | | 4 | 1.85 | | | 4 | 1.80 | | | 4 | 1.85 | 4 | 1.85 | | | | | 4 | 1.85 | | |
| | | 0 | 1.60 | | | 0 | 1.61 | | | 0 | 1.61 | | | | | | | | | | |
| | Yes | 1 | 1.69 | | | 1 | 1.69 | | | 1 | 1.68 | | | | | | | | | | |
| | | 4 | 1.71 | | | 4 | 1.73 | | | 4 | 1.72 | | | | | | | | | | |
| | | 0 | 1.74 | 0 | 1.82 | 0 | 1.78 | | | | | 0 | 1.74 | | | | | | | | |
| **50/50 | No | 1 | 1.68 | 1 | 1.76 | 1 | 1.69 | | | | | 1 | 1.59 | | | | | | | | |
| | | 4 | 1.61 | 4 | 1.63 | 4 | 1.63 | | | | | 4 | 1.59 | | | | | | | | |
| | | | | | | 0 | 1.85 | | | | | | | | | | | | | | |
| **70/30 | No | | | | | 1 | 1.80 | | | | | | | | | | | | | | |
| | | | | | | 4 | 1.73 | | | | | | | | | | | | | | |
| | | | | | | 0 | 1.60 | | | | | | | | | | | | | | |
| | Yes | | | | | 1 | 1.59 | | | | | | | | | | | | | | |
| | | | | | | 4 | 1.60 | | | | | | | | | | | | | | |
| | | | | | | 0 | 1.85 | | | | | | | | | | | | | | |
| **100/0 | No | | | | | 1 | 1.85 | | | | | | | | | | | | | | |
| | | | | | | 4 | 1.85 | | | | | | | | | | | | | | |
| | | | | | | 0 | 1.60 | | | | | | | | | | | | | | |
| | Yes | | | | | 1 | 1.63 | | | | | | | | | | | | | | |
| | | | | | | 4 | 1.67 | | | | | | | | | | | | | | |

*electrolyte = 28% NaOH
**electrolyte = 33% KOH
$^1$First column data are times expressed in months.
$^2$Second column data are open circuit voltages expressed in volts.

It is to be understood that other modifications and changes in the preferred embodiments of the invention herein shown and described can also be made without departing from the spirit and scope of the invention.

What is claimed is:

1. An alkaline cell having a negative electrode, an alkaline electrolyte and a positive electrode comprising at least 50 weight percent of divalent silver oxide based on the dry weight of the positive electrode, the improvement comprising incorporating zinc oxide in an amount between about 2 and about 10 weight percent based on the dry weight of the divalent silver oxide in the positive electrode so as to reduce the duration of the divalent silver oxide voltage step during discharge of the cell.

2. The alkaline cell of claim 1 wherein the zinc oxide is present in an amount between about 2.5 and about 3.5 weight percent based on the dry weight of the divalent silver oxide in the positive electrode.

3. The alkaline cell of claim 1 wherein the positive electrode contains 50 percent or less by weight of monovalent silver oxide based on the dry weight of the positive electrode.

4. The alkaline cell of claim 3 wherein the zinc oxide is present in an amount between about 2.5 and about 3.5 weight percent based on the dry weight of the divalent silver oxide in the positive electrode.

5. The alkaline cell of claim 1 wherein the positive electrode has a density of less than about 90 grams per cubic inch.

6. The alkaline cell of claim 5 wherein the zinc oxide is present in an amount between about 2.5 and about 3.5 weight percent based on the dry weight of the divalent silver oxide in the positive electrode.

7. The alkaline cell of claim 1 wherein the positive electrode contains a minor amount of a material selected from the group consisting of ethylene bis-stearamide, zinc stearate, lead stearate and calcium stearate.

8. The alkaline cell of claim 1 wherein the negative electrode is selected from the group consisting of zinc, cadmium and indium.

9. The alkaline cell of claim 8 wherein the negative electrode is zinc.

10. The alkaline cell of claim 3 wherein the negative electrode comprises zinc and the electrolyte comprises aqueous potassium hydroxide or sodium hydroxide.

11. The alkaline cell of claim 1 wherein the negative electrode is zinc and the electrolyte is aqueous potassium hydroxide.

12. The alkaline cell of claim 1 wherein the negative electrode is zinc and the electrolyte is aqueous sodium hydroxide.

13. The alkaline cell of cell 1 wherein the positive electrode is housed in a conductive container, a zinc screen is disposed at the interface of the conductive container and the positive electrode, and wherein the zinc oxide is present in an amount between about 0.5 and about 5 weight percent based on the dry weight of the divalent silver oxide in the positive electrode.

* * * * *

UNITED STATES PATENT AND TRADEMARK OFFICE
CERTIFICATE OF CORRECTION

PATENT NO. : 4,167,609

DATED : September 11, 1979

INVENTOR(S) : Robert F. Scarr

It is certified that error appears in the above-identified patent and that said Letters Patent are hereby corrected as shown below:

Delete Table V and substitute therefor the following Table V:

TABLE V

| Positive electrode $AgO/Ag_2O$ (%) | Zn Screen | Pellet Density ||||||||||
|---|---|---|---|---|---|---|---|---|---|---|---|
| | | Low Density Wt. % ZnO in Cathode |||||| High Density Wt. % ZnO in Cathode ||||
| | | $0.0^2$ | $0.5^2$ | $1.5^2$ | $2.1^2$ | $3.0^2$ | $4.5^2$ | $0.0^2$ | $0.5^2$ | $1.5^2$ | $4.5^2$ |
| *50/50 | No | 0 1.86<br>1 1.86<br>4 1.85 | 0 1.86<br>1 1.85<br>4 1.85 | 0 1.86<br>1 1.83<br>4 1.78 | | | 0 1.86<br>1 1.85<br>4 1.82 | 0 1.86<br>1 1.86<br>4 1.82 | 0 1.87<br>1 1.86<br>4 1.84 | 0 1.86<br>1 1.86<br>4 1.83 | 0 1.86<br>1 1.85<br>4 1.83 |
| *70/30 | No | 0 1.86<br>1 1.86<br>4 1.85 | | 0 1.86<br>1 1.84<br>4 1.85 | 0 1.86<br>1 1.85<br>4 1.85 | | 0 1.86<br>1 1.85<br>4 1.82 | | | 0 1.86<br>1 1.85<br>4 1.85 | |
| | Yes | 0 1.61<br>1 1.61<br>4 1.70 | | 0 1.61<br>1 1.61<br>4 1.66 | 0 1.61<br>1 1.62<br>4 1.71 | | | | | | |
| *100/0 | No | 0 1.86<br>1 1.85<br>4 1.85 | | 0<br>1 1.85<br>4 1.80 | | 0 1.86<br>1 1.85<br>4 1.85 | 0 1.86<br>1 1.85<br>4 1.85 | | | 0 1.86<br>1 1.85<br>4 1.85 | |
| | Yes | 0 1.60<br>1 1.69<br>4 1.71 | | 0 1.61<br>1 1.69<br>4 1.73 | | 0 1.61<br>1 1.68<br>4 1.72 | | | | | |
| **50/50 | No | 0 1.74<br>1 1.68<br>4 1.61 | 0 1.82<br>1 1.76<br>4 1.63 | 0 1.78<br>1 1.65<br>4 1.63 | | | 0 1.74<br>1 1.59<br>4 1.59 | | | | |
| **70/30 | No | | | 0 1.85<br>1 1.80<br>4 1.73 | | | | | | | |
| | Yes | | | 0 1.60<br>1 1.59<br>4 1.60 | | | | | | | |

UNITED STATES PATENT AND TRADEMARK OFFICE
CERTIFICATE OF CORRECTION

PATENT NO. : 4,167,609                       Page 2 of 2

DATED : September 11, 1979

INVENTOR(S) : Robert F. Scarr

It is certified that error appears in the above—identified patent and that said Letters Patent is hereby corrected as shown below:

| **100/0 | No | | | 0 1:85<br>1 1:85<br>4 1.85 | | | | | | |
|---|---|---|---|---|---|---|---|---|---|---|
| | Yes | | | 0 1:60<br>1 1:63<br>4 1.67 | | | | | | |

Signed and Sealed this

First Day of July 1980

[SEAL]

Attest:

SIDNEY A. DIAMOND

Attesting Officer        Commissioner of Patents and Trademarks